(12) United States Patent
Anao

(10) Patent No.: US 6,733,696 B2
(45) Date of Patent: May 11, 2004

(54) CONDUCTIVE PASTE

(75) Inventor: Kimiharu Anao, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 10/453,585

(22) Filed: Jun. 4, 2003

(65) Prior Publication Data

US 2003/0227008 A1 Dec. 11, 2003

(30) Foreign Application Priority Data

Jun. 7, 2002 (JP) .......................... 2002-167102

(51) Int. Cl.$^7$ .................................................. H01B 1/22
(52) U.S. Cl. ...................................... 252/514; 106/1.19
(58) Field of Search ........................... 252/514; 106/1.19

(56) References Cited

U.S. PATENT DOCUMENTS 6,277,169 B1 * 8/2001 Hampden-Smith et al. ... 75/336
6,406,646 B1 * 6/2002 Lee et al. ................... 252/514

FOREIGN PATENT DOCUMENTS

| JP | 09-053032 | 2/1997 |
| JP | 09-120710 | 5/1997 |
| JP | 09-282941 | 10/1997 |
| JP | 11-185528 | 7/1999 |
| JP | 2001-220607 | 8/2001 |

* cited by examiner

*Primary Examiner*—Mark Kopec
(74) *Attorney, Agent, or Firm*—Dickstein, Shapiro, Morin & Oshinsky, LLP.

(57) ABSTRACT

A conductive paste contains a metal powder as the conductive component, and an organic vehicle. The metal powder is mainly composed of silver, and has an average particle diameter of about 1.5 to 3.5 $\mu$m. The cumulative volume percent of particles of the metal powder which are within the average particle diameter ±0.5 $\mu$m in a particle-size distribution is about 40% or less. The average particle diameter and the cumulative volume percent are measured with a laser diffraction/scattering analyzer. The conductive paste can be used to form inner electrodes of a composite inductor.

16 Claims, 3 Drawing Sheets

US 6,733,696 B2

CONDUCTIVE PASTE

BACKGROUND OF THE INVENTION

1. Field of the Invention

The present invention relates to conductive pastes. In particular, it relates to a conductive paste for forming internal electrodes of composite ceramic electronic components such as composite inductors, composite ceramic capacitors and multilayer ceramic substrates.

2. Description of the Related Art

Generally, composite inductors must have low resistance. The internal electrodes thereof are thus composed of a conductive paste composed of, or mainly composed of, silver, i.e., a silver paste.

The silver paste is prepared by mixing a predetermined amount of silver powder and a predetermined amount of an organic vehicle. The organic vehicle is prepared by dissolving ethyl cellulose in a solvent such as terpineol or butyl carbitol.

FIG. 1A is a perspective view of a composite inductor made using the silver paste. FIG. 1B is a perspective exploded view for explaining the structure and the manufacturing method of the composite inductor.

As shown in FIG. 1A, the composite inductor includes an element (element chip) 51 and a pair of external electrodes 53a and 53b. The element 51 includes a multilayer coil 52, and the two ends of the coil 52 are connected to the external electrodes 53a and 53b, respectively.

Referring now to FIG. 1B, the composite inductor is made as follows. First, a plurality of magnetic green sheets 54, each having a coil pattern (internal electrode) 52a printed on a surface using the silver paste by screen-printing or the like, are stacked. Magnetic green sheets (outer layer sheets) 54a without coil patterns are then stacked on the top and on the bottom of the stacked magnetic green sheets 54. The stacked magnetic green sheets 54 and 54a are press-bonded. The coil patterns 52a become connected to each other through via holes 55, thereby forming a coil 52. After the stacked sheets (green element) are baked to prepare the element 51, a conductive paste is applied on the two ends of the element 51 and baked to form the external electrodes 53a and 53b, as shown in FIG. 1A.

In an actual fabrication process, mother sheets, each provided with many coil patterns, are stacked and press-bonded to form a mother composite. The mother composite is cut into chips of a predetermined size. After the chips are baked, external electrodes are formed on the chips. According to this process, a large number of composite inductors can be fabricated simultaneously.

The composite inductors manufactured by this process, however, suffer from delamination of the ceramic layers and undetectable microcracks. In particular, although use of a conductive paste containing a highly dispersible silver powder or silver-containing powder having uniform particle size results in high print quality, structural defects such as delamination or cracks frequently occur. Thus, high reliability is not easily achieved.

The use of these conductive pastes causes structural defects because internal electrodes made therefrom shrink rapidly at around 400° C. during the baking due to uniform particle size (sharp particle-size distribution) of the powder. This causes delamination of adjacent ceramic layers sandwiching the internal electrodes, and microcracks. The particular temperature at which rapid shrinkage occurs depends on the particle size of the silver powder, the type of resin constituting the organic vehicle, and the like. Generally, rapid shrinkage occurs in the temperature range of 350 to 500° C.

Other types of known ceramic electronic component such as composite ceramic capacitors and multilayer ceramic substrates also have the above-described drawbacks.

SUMMARY OF THE INVENTION

An object of the present invention is to overcome the drawbacks of the conventional art by providing a conductive paste that enables efficient production of composite ceramic electronic components free of structural defects such as delamination and cracks.

To achieve this object, the present invention provides a conductive paste for forming an internal electrode of a composite ceramic electronic component, the conductive paste containing (a) a metal powder comprising silver as the main component and (b) an organic vehicle. The metal powder has an average particle diameter of about 1.5 to 3.5 $\mu$m. The cumulative volume percent of particles of the metal powder within the average particle diameter ±0.5 $\mu$m in a particle-size distribution is about 40% or less. The average particle diameter and the cumulative volume percent are determined with a laser diffraction/scattering analyzer.

Use of the above-described metal powder reduces or prevents structural defects, such as delamination and cracks, of the composite ceramic electronic component without significantly degrading printability. Thus, highly reliable composite ceramic components with desired characteristics can be efficiently manufactured.

Since the metal powder containing silver as the main component has a wide particle-size distribution range, rapid shrinkage of the internal electrodes can be moderated or eliminated during baking, thereby achieving gradual shrinking. As a result, the structural defects such as delamination and micro cracks can be efficiently prevented.

More preferably, the average particle diameter of the metal powder is in the range of about 2.0 to 3.0 $\mu$m. Moreover, the cumulative volume percent of the particles of the metal powder within the average particle diameter ±0.5 $\mu$m in a particle-size distribution is more preferably about 36% or less.

Examples of the metal powder containing silver as the main component include a silver-palladium alloy powder and a mixture of silver powder and palladium. Alternatively, a powder of an alloy of silver and a metal other than palladium, or a mixture of silver powder and a metal powder other than palladium powder may be used.

The average particle diameter of the metal powder is in the range of about 1.5 to 3.5 $\mu$m. At an average particle diameter exceeding about 3.5 $\mu$m, the linearity of the printing is degraded, and a conductive paste containing such a metal powder is not suited for fine line printing. At an average particle diameter of less than about 1.5 $\mu$m, the internal electrodes are not sufficiently exposed at the side faces of the composite element prepared by stacking and press-bonding the green sheets, and baking the press-bonded green sheets. As a result, the connection between the internal electrodes and the external electrodes becomes unreliable. The composite ceramic electronic component made using the conductive paste may be a composite inductor.

Composite inductors must have low resistance. Thus, a metal powder mainly containing silver is generally used as the conductive component of the conductive paste for forming internal electrodes of the inductors. When the present invention is applied to making internal electrodes of a composite inductor, the resulting composite inductor is free of structural defects such as delamination and cracks, thereby achieving high production efficiency.

DESCRIPTION OF THE PREFERRED EMBODIMENT

Figure 1A:
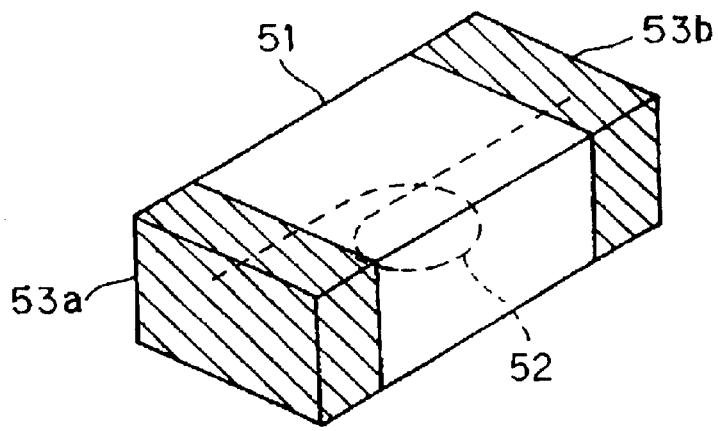
FIG. 1A is a perspective view of a conventional composite inductor and FIG. 1b is a perspective exploded view for explaining the structure and the manufacturing method of the composite inductor.
Figure 1B:
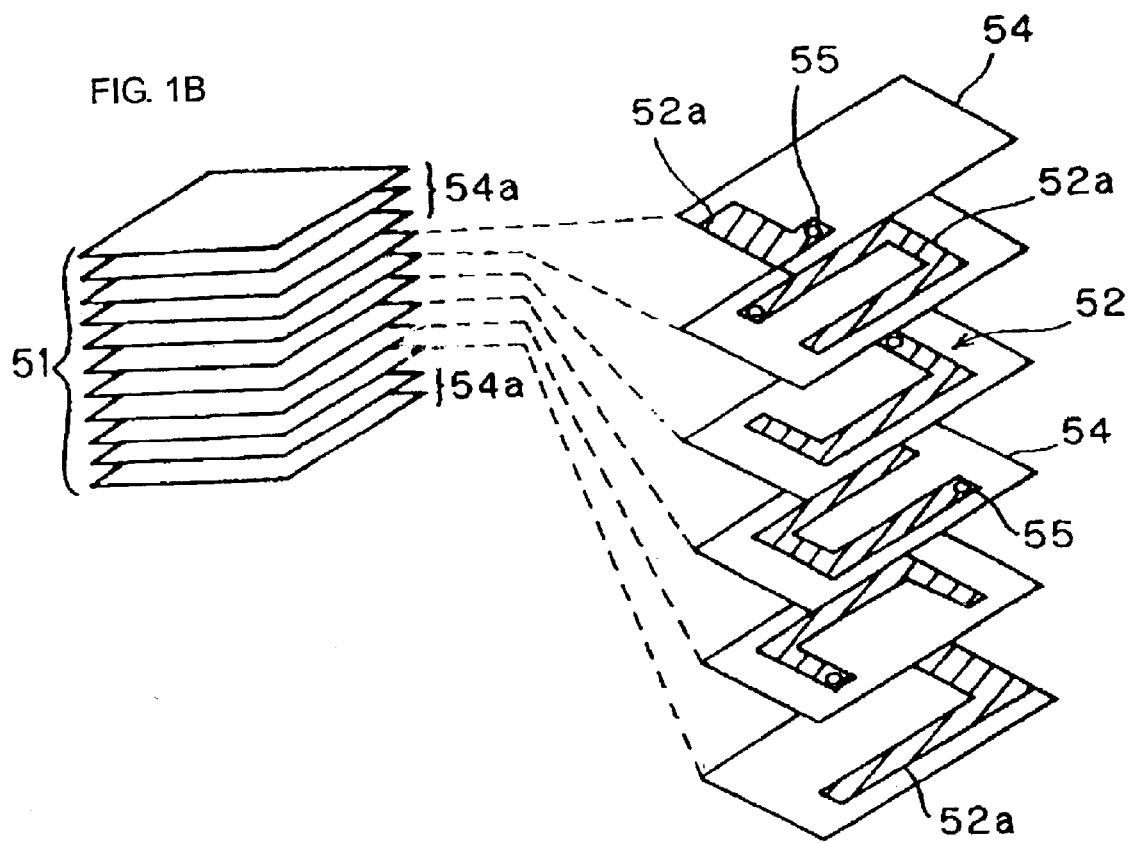
Figure 2A:
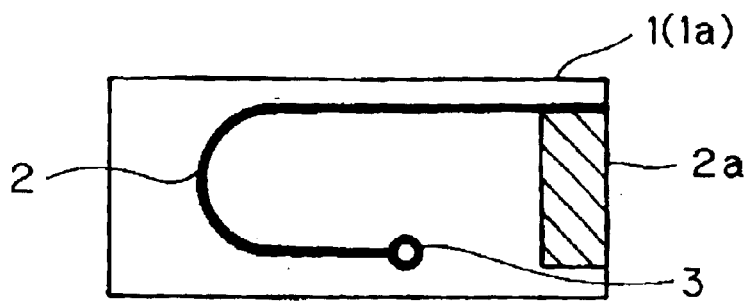
FIGS. 2A to 2F show ferrite green sheets provided with coil patterns (internal electrode patterns) made using a conductive paste of an embodiment of the present invention.
Figure 2B:
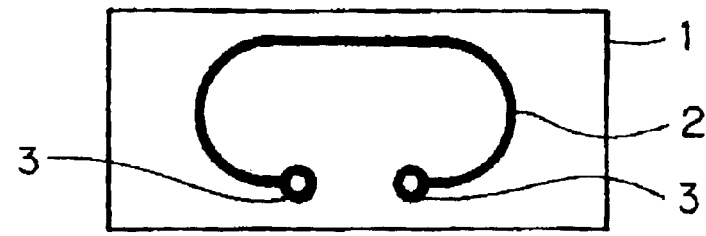
Figure 2C:
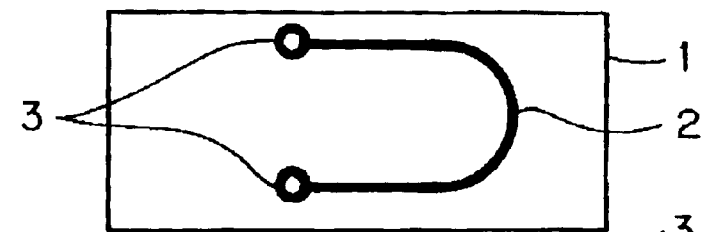
Figure 2D:
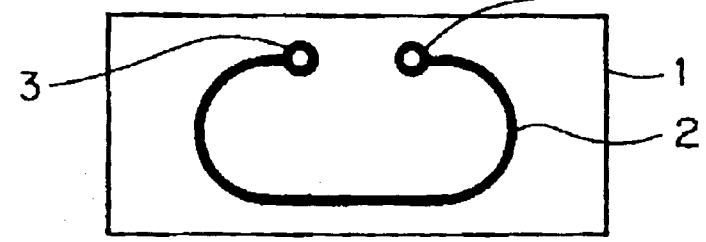
Figure 2E:
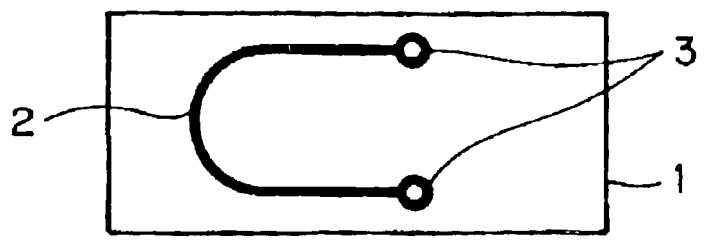
Figure 2F:
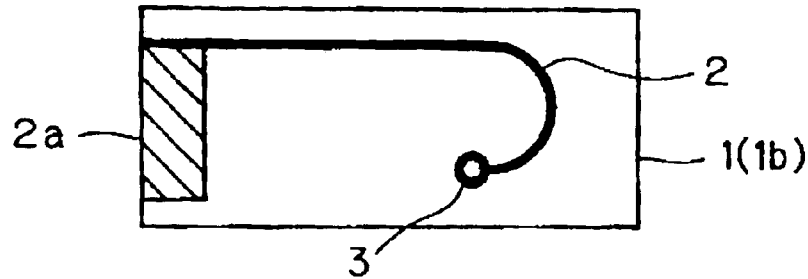

In a preferred embodiment, 77.5 percent by weight of a conductive component, which is a silver powder, is blended with 22.5 percent by weight of an organic vehicle containing an organic binder, which is ethyl cellulose, and a solvent, which is terpineol. The mixture is agitated to prepare a conductive paste.

The silver powder has an average particle diameter of about 1.5 to 3.5 $\mu$m, and the cumulative volume percent of particles of the silver powder within the average particle diameter ±0.5 $\mu$m in a particle-size distribution is about 40% or less.

The cumulative volume percent and the average particle diameter are measured with a laser diffraction/scattering particle-size distribution analyzer, namely, a microtrac HRA particle size analyzer, Model 9320-X100, manufactured by Leeds & Northrup Company.

The conductive paste is applied on ferrite green sheets by screen-printing to form coil patterns, i.e., inner electrode patterns. The ferrite green sheets with the coil patterns are then stacked. Outerlayer ferrite green sheets having no coil patterns are stacked at the top and at the bottom of the stacked ferrite green sheets with the coil patterns. The stacked ferrite green sheets with and without coil patterns are press-bonded, and the resulting stack is cut into chips of a predetermined size. The chips are then subjected to heating to drive off solvent and are baked. External electrodes are formed on each of the chips to prepare composite inductors.

EXAMPLES

The present invention will now be described in detail by way of EXAMPLES.

Preparation of Composite Inductor of Example 1

(1) A conductive paste of EXAMPLE 1 of the present invention was prepared by blending the materials at the following ratios:

silver powder: 77.5 percent by weight ethyl cellulose: 2.2 percent by weight, and terpineol: 20.3 percent by weight.

The silver powder had the particle size distribution shown in the column of EXAMPLE 1 in Table 1. The average particle diameter was 2.0 $\mu$m, and the cumulative volume percent of particles within the average particle diameter ±0.5 $\mu$m was 33.6%.

(2) A ferrite powder was blended with a binder, which was butyral resin, a plasticizer, a dispersant, and the like to prepare a slurry. The slurry was formed into ferrite green sheets 1 by the doctor blade method. The ferrite green sheets 1 had a thickness of 45 $\mu$m before baking.

(3) The conductive paste prepared in (1) was applied on each of the ferrite green sheets 1 by screen-printing to form predetermined coil patterns (internal electrode patterns) 2, as shown in FIGS. 2A to 2F. The coil patterns 2 had a thickness of 9.5 $\mu$m measured by a fluorescent X-ray spectrometric method. Among the ferrite green sheets 1 shown in FIGS. 2A to 2F, the topmost ferrite green sheet 1, hereinafter referred to as "ferrite green sheet 1$a$", and the bottommost ferrite green sheet 1, hereinafter referred to as "ferrite green sheet 1$b$", were each provided with the coil pattern 2 and an extraction electrode 2$a$.

(4) The ferrite green sheets 1 shown in FIGS. 2A to 2F were stacked. Outerlayer ferrite green sheets (not shown) without coil patterns were then stacked at the top and the bottom of the stacked ferrite green sheets 1 with the coil patterns. The stacked ferrite green sheets were press-bonded so as to connect the coil patterns 2 to each other through via holes 3 and to form a composite coil 4, (see FIG. 3). The stack was then subjected to heating and was baked.

Figure 3:
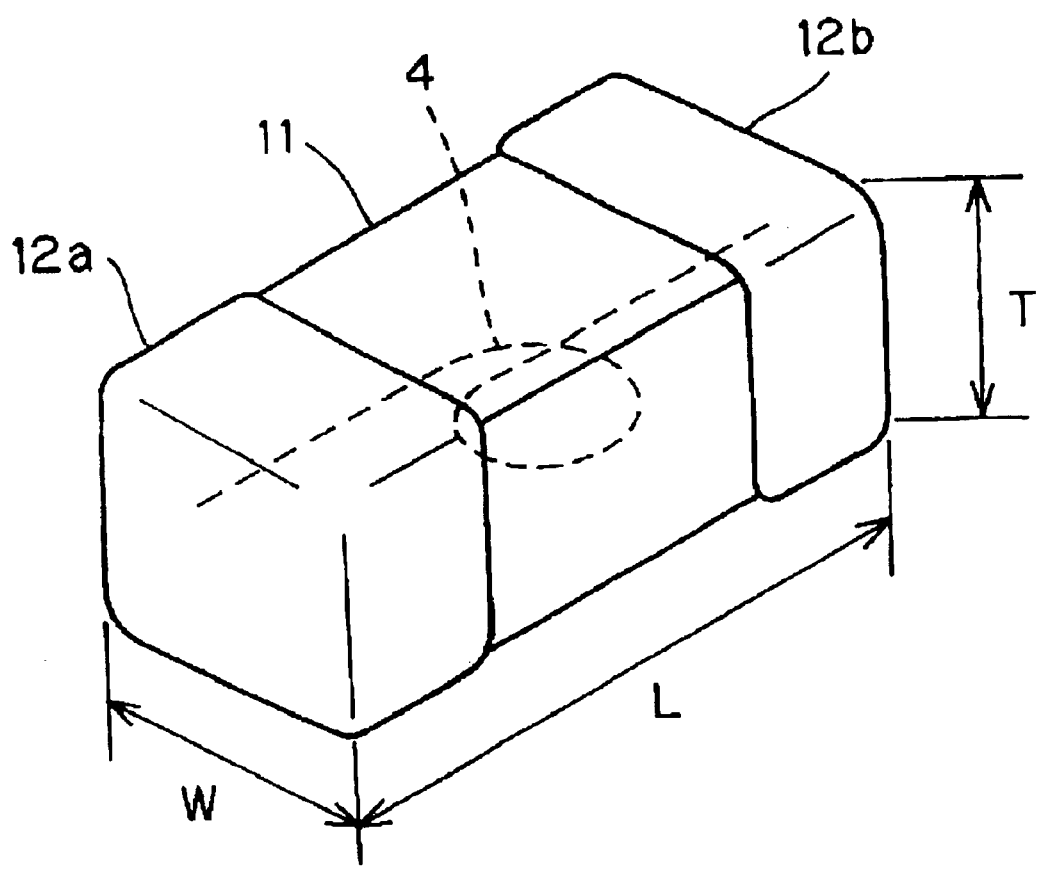
FIG. 3 is a perspective diagram of a composite inductor made using the conductive paste of the present invention.

(5) Referring now to FIG. 3, external electrodes 12$a$ and 12$b$ are formed on a resulting element chip (sintered chip) 11 to form a composite inductor of EXAMPLE 1 constituted from the element (element chip) 11 having the composite coil 4 inside and the external electrodes 12$a$ and 12$b$ connected to the two ends of the composite coil 4, respectively. The composite inductor is 1.6 mm in length (L), 0.8 mm in width (W) and 0.8 mm in thickness (T).

Preparation of Composite Inductor of Example 2

A composite inductor of EXAMPLE 2 was prepared as in EXAMPLE 1 but with a silver powder having a particle size distribution shown in the column of EXAMPLE 2 in Table 1 and an average particle diameter of 2.5 $\mu$m. The cumulative weight percent of particles within diameter ±0.5 $\mu$m in the particle-size distribution was 35.3%.

Preparation of Composite Inductor of Example 3

A composite inductor of EXAMPLE 3 was prepared as in EXAMPLE 1 but with a silver powder having a particle size distribution shown in the column of EXAMPLE 3 in Table 1 and an average particle diameter of 3.0 $\mu$m. The cumulative weight percent of particles within the average diameter ±0.5 $\mu$m in the particle-size distribution was 31.7%.

Preparation of Composite Inductor of Comparative Example 1

A composite inductor of COMPARATIVE EXAMPLE 1 was prepared as in EXAMPLE 1 except that the conductive paste contained a silver powder having the same average particle diameter, i.e., 2.0 $\mu$m, but the particle size distribution, the cumulative weight percent of particles within the average diameter ±0.5 $\mu$m, was 47.6%.

Preparation of Composite Inductor of Comparative Example 2

A composite inductor of COMPARATIVE EXAMPLE 2 was prepared as in EXAMPLE 2 except that the conductive paste contained a silver powder having the same average particle diameter, i.e., 2.5 $\mu$m, but the particle size distribution, the cumulative weight percent of particles within the average diameter ±0.5 $\mu$m, was 52.4%.

Preparation of Composite Inductor of Comparative Example 3

A composite inductor of COMPARATIVE EXAMPLE 3 was prepared as in EXAMPLE 3 except that the conductive paste contained a silver powder having the same average particle diameter, i.e., 3.0 μm, but the particle size distribution, i.e., the cumulative weight percent of particles within the average diameter ±0.5 μm, was 47.9%.

Evaluation of Composite Inductors of Examples 1 to 3

The composite inductors of EXAMPLES 1 to 3 and COMPARATIVE EXAMPLES 1 to 3 were examined to investigate delamination and presence of microcracks. The results are shown in Table 1.

In the composite inductor of COMPARATIVE EXAMPLE 3 using the silver powder having an average diameter of 3.0 μm, which was the same as that of EXAMPLE 3, and a sharp particle-size distribution, i.e., a cumulative weight percent of the particles within ±0.5 μm of the average particle diameter of 47.9%, structural defects such as delamination and microcracks occurred at a high frequency, i.e., 86%.

These results demonstrate that use of a conductive paste containing, a silver powder having an average particle diameter of 1.5 to 3.5 μm and a cumulative weight percent of the particles within ±0.5 μm of the average particle

TABLE 1

| | Average particle diameter (μm) | Particle-size distribution of silver powder (%) | | | | | | | | | Cumulative weight percent (%) *1) | Occurrence of structural defects (%) *2) |
|---|---|---|---|---|---|---|---|---|---|---|---|---|
| | | ≤0.5 (μm) | 0.5< ≤1.0 (μm) | 1.0< ≤1.5 (μm) | 1.5< ≤2.0 (μm) | 2.0< ≤2.5 (μm) | 2.5< ≤3.0 (μm) | 3.0< ≤3.5 (μm) | 3.5< ≤4.0 (μm) | 4.0< ≤4.5 (μm) | 4.5< (μm) | | |
| EXAMPLE 1 | 2.0 | 0.4 | 13.6 | 17.0 | 18.9 | 14.7 | 12.3 | 10.1 | 6.4 | 2.6 | 4.0 | 33.6 | 0 |
| EXAMPLE 2 | 2.5 | 0.7 | 6.3 | 12.1 | 13.3 | 17.6 | 17.7 | 14.7 | 8.0 | 4.4 | 5.2 | 35.3 | 0 |
| EXAMPLE 3 | 3.0 | 0.0 | 2.5 | 9.0 | 10.6 | 13.0 | 14.9 | 16.8 | 15.6 | 10.5 | 7.1 | 31.7 | 0 |
| COMPARATIVE EXAMPLE 1 | 2.0 | 0.0 | 6.8 | 18.8 | 24.4 | 23.2 | 14.1 | 6.7 | 3.2 | 1.3 | 1.5 | 47.6 | 68 |
| COMPARATIVE EXAMPLE 2 | 2.5 | 0.0 | 2.5 | 6.9 | 12.6 | 28.0 | 24.4 | 14.0 | 5.2 | 2.8 | 3.6 | 52.4 | 75 |
| COMPARATIVE EXAMPLE 3 | 3.0 | 0.0 | 2.3 | 3.5 | 6.5 | 12.8 | 24.9 | 23.0 | 12.1 | 8.9 | 6.0 | 47.9 | 86 |

*1) Cumulative weight percent of particles within ±0.5 μm of the average particle diameter in a particle-size distribution
*2) Percentage of samples at which delamination and/or cracks occurred among one hundred samples As shown in Table 1, the composite inductors of EXAMPLES 1 to 3 were free of structural defects such as delamination and microcracks.

In the composite inductor of COMPARATIVE EXAMPLE 1 using the silver powder having an average diameter of 2.0 μm, which was the same as that of EXAMPLE 1, and a sharp particle-size distribution, i.e., a cumulative weight percent of the particles within ±0.5 μm of the average particle diameter of 47.6%, structural defects such as delamination and microcracks occurred at a high frequency, i.e., 68%.

In the composite inductor of COMPARATIVE EXAMPLE 2 using the silver powder having an average diameter of 2.5 μm, which was the same as that of EXAMPLE 2, and a sharp particle-size distribution, i.e., a cumulative weight percent of the particles within ±0.5 μtm of the average particle diameter of 52.4%, structural defects such as delamination and microcracks occurred at a high frequency, i.e., 75%.

diameter of 40% or less can drastically reduce structural defects such as delamination and microcracks in a conductive component. The average particle diameter is more preferably 2.0 to 3.0 μm, and the cumulative weight percent of the particles within ±0.5 μm of the average particle diameter is more preferably about 36% or less.

Shrinkage Ratio During Baking

The behavior of the shrinkage ratio of the conductive pastes of EXAMPLES 1 to 3 and COMPARATIVE EXAMPLES 1 to 3 was examined. In particular, (1) overall shrinkage ratio when the conductive pastes were baked at 850° C. and (2) the shrinkage ratio per 50° C. in the temperature range of 350 to 500° C. at which rapid shrinkage occurred were examined. In (1), the shrinkage ratio of the entire baking process during which the temperature was increased from room temperature to 850° C. was determined. The results are shown in Table 2.

TABLE 2

| | Average particle diameter (μm) | Cumulative weight percent of particles within ±0.5 μm if average particle diameter (%) | Overall shrinkage ratio when baked at 850° C. (%) | Shrinkage ratio per 50° C. in the temperature range of 350 to 500° C. (%) | Occurrence of structural defects (%) *1) |
|---|---|---|---|---|---|
| EXAMPLE 1 | 2.0 | 33.6 | 14.7 | ≤3.0 | 0 |
| EXAMPLE 2 | 2.5 | 35.3 | 15.2 | ≤3.0 | 0 |
| EXAMPLE 3 | 3.0 | 31.7 | 15.5 | ≤3.0 | 0 |

TABLE 2-continued

|  | Average particle diameter (μm) | Cumulative weight percent of particles within ±0.5 μm if average particle diameter (%) | Overall shrinkage ratio when baked at 850° C. (%) | Shrinkage ratio per 50° C. in the temperature range of 350 to 500° C. (%) | Occurrence of structural defects (%) *1) |
|---|---|---|---|---|---|
| COMPARATIVE EXAMPLE 1 | 2.0 | 47.6 | 15.3 | 8.3 | 68 |
| COMPARATIVE EXAMPLE 2 | 2.5 | 52.4 | 16.5 | 9.7 | 75 |
| COMPARATIVE EXAMPLE 3 | 3.0 | 47.9 | 17.0 | 9.8 | 86 |

*1) The percent of samples in which delamination and/or cracks occurred among one hundred samples The shrinkage ratio (%) was determined from the relationship:

Shrinkage ratio (%)={(B−A)/B}×100 wherein A represents the thickness of the shrunk electrode after baking, and B represents the thickness of the unbaked electrode.

Samples were prepared as follows. Each of the conductive pastes was dried into powder. The powder was compacted in a die at a pressure of approximately 98 MPa to form a compact. The shrinkage ratios of the compact were measured by thermal mechanical analysis (TMA).

As shown in Table 2, the overall shrinkage ratios of EXAMPLES 1 to 3 were not significantly different from those of COMPARATIVE EXAMPLES 1 to 3. However, the shrinkage ratios per 50° C. in the temperature range of 350 to 500° C. were not more than 3.0% in EXAMPLES 1 to 3 but were at least 8% in COMPARATIVE EXAMPLES 1 to 3. In EXAMPLES 1 to 3, delamination and cracks were prevented due to the lower shrinkage ratios.

In the above-described embodiment and examples, silver powder was used as an example of a metal powder. However, the metal powder is not limited to the silver powder. Various metal powders mainly composed of silver, such as a Ag—Pd alloy powder, a mixture of Ag powder and Pd, and the like may be used.

Although the organic vehicle containing ethyl cellulose and terpincol was used in the above described embodiment and examples, the organic vehicle is not limited to this. Other organic vehicles may be used.

Although the composite inductors are described as examples in the above-described embodiment and examples, the present invention can be applied to other composite ceramic electronic components such as composite ceramic capacitors, multilayer ceramic substrates and the like. Delamination and cracks can still be prevented and high reliability can be achieved by applying the present invention to these composite ceramic electronic components.

The scope of the present invention is by no means limited by the above-described embodiments and examples. Various other applications and modifications are possible without departing from the spirit of the present invention.

What is claimed is:

1. A conductive paste for forming an internal electrode of a composite ceramic electronic component, the conductive paste comprising;
    (a) a metal powder comprising silver as the main component; and
    (b) an organic vehicle,
    wherein the metal powder has an average particle diameter of about 1.5 to 3.5 μm, and
    the cumulative volume percent of the particles of the metal powder which are within the average particle diameter ±0.5 μm in particle-size distribution is about 40% or less.

2. The conductive paste according to claim 1, wherein the composite ceramic electronic component is a composite inductor.

3. The conductive paste according to claim 2, wherein
    the metal powder has an average particle diameter of about 2 to 3 μm, and
    the cumulative volume percent of the particles of the metal powder which are within the average particle diameter ±0.5 μm in particle-size distribution is about 36% or less.

4. The conductive paste according to claim 3, wherein the metal power is selected from the group consisting of silver, silver and palladium and a silver-palladium alloy.

5. The conductive paste according to claim 1, wherein
    the metal powder has an average particle diameter of about 2 to 3 μm, and
    the cumulative volume percent of the particles of the metal powder which are within the average particle diameter ±0.5 μm in particle-size distribution is about 36% or less.

6. The conductive paste according to claim 5, wherein the metal power is selected from the group consisting of silver, silver and palladium and a silver-palladium alloy.

7. The conductive paste according to claim 1, wherein the metal power is selected from the group consisting of silver, silver and palladium and a silver-palladium alloy.

8. In a method of making an electronic part which comprising applying a conductive paste to a substrate and baking the resulting composite, the improvement which comprises utilizing the conductive paste of claim 1.

9. The method according to claim 8 in which the substrate comprises ferrite.

10. In a method of making an electronic part which comprising applying a conductive paste to a substrate and baking the resulting composite, the improvement which comprises utilizing the conductive paste of claim 2.

11. In a method of making an electronic part which comprising applying a conductive paste to a substrate and baking the resulting composite, the improvement which comprises utilizing the conductive paste of claim 3.

12. In a method of making an electronic part which comprising applying a conductive paste to a substrate and baking the resulting composite, the improvement which comprises utilizing the conductive paste of claim 4.

13. The method according to claim 11 in which the substrate comprises ferrite.

14. In a method of making an electronic part which comprising applying a conductive paste to a substrate and baking the resulting composite, the improvement which comprises utilizing the conductive paste of claim 6.

15. In a method of making an electronic part which comprising applying a conductive paste to a substrate and baking the resulting composite, the improvement which comprises utilizing the conductive paste of claim 5.

16. In a method of making an electronic part which comprising applying a conductive paste to a substrate and baking the resulting composite, the improvement which comprises utilizing the conductive paste of claim 7.

* * * * *